United States Patent
Watanabe et al.

(10) Patent No.: US 8,669,721 B2
(45) Date of Patent: Mar. 11, 2014

(54) SOLID STATE LIGHT SOURCE BASED LIGHTING DEVICE AND LIGHTING SYSTEM

(75) Inventors: Koji Watanabe, Kyoto (JP); Hiromitsu Mizukawa, Osaka (JP); Nobuo Ukita, Hyogo (JP); Kazuhiro Nishimoto, Nara (JP)

(73) Assignee: Panasonic Corporation, Osaka (JP)

( * ) Notice: Subject to any disclaimer, the term of this patent is extended or adjusted under 35 U.S.C. 154(b) by 152 days.

(21) Appl. No.: 13/428,655

(22) Filed: Mar. 23, 2012

(65) Prior Publication Data

US 2012/0262080 A1  Oct. 18, 2012

(30) Foreign Application Priority Data

Mar. 23, 2011 (JP) .................. 2011-065091

(51) Int. Cl.
*G05F 1/00* (2006.01)
*H05B 37/02* (2006.01)
*H05B 39/04* (2006.01)
*H05B 41/36* (2006.01)

(52) U.S. Cl.
USPC ........... 315/307; 315/224; 315/294; 315/297; 315/308

(58) Field of Classification Search
None
See application file for complete search history.

(56) References Cited

U.S. PATENT DOCUMENTS 7,759,881 B1 * 7/2010 Melanson ...................... 315/307
2011/0227496 A1 * 9/2011 Lin et al. ................... 315/209 R

FOREIGN PATENT DOCUMENTS

JP  2005267999  7/2010

* cited by examiner

*Primary Examiner* — Anh Tran
(74) *Attorney, Agent, or Firm* — Waddey Patterson; Mark J. Patterson; Mark A. Pitchford

(57) ABSTRACT

A lighting device is capable of realizing a stable dimming control in a wide range of light output. The lighting device includes a DC power circuit for providing power to a switching element of the lighting device. A current controller switches the switching element to enable a current to flow from the DC power circuit through a solid state light source and maintain the current from the DC power circuit through the solid state light source current controller at a predetermined current. The current controller includes a first switching controller operable to change a width of an on-pulse provided to the switching element and a second switching controller operable to determine a burst-on time during which the on-pulses determined by the first switching controller are provided to the switching element. The burst-on time is longer than an on-pulse period of the first switching controller.

20 Claims, 6 Drawing Sheets

SOLID STATE LIGHT SOURCE BASED LIGHTING DEVICE AND LIGHTING SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is hereby incorporated by reference: Japanese Patent Application No. 2011-065091, filed Mar. 23, 2011.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to a solid state light source lighting device for lighting a solid state light source such as a light-emitting diode (LED), as well as a lighting system using the same.

Japanese Patent Application No. JPA 2005-267999 discloses an LED-type illumination device capable of performing a dimming control for an LED based on a lighting control signal. This device carries out, by determining a dimming ratio based on a lighting control signal, PWM control for controlling lighting of the LED if the dimming ratio is higher (or brighter) than a predetermined value, and peak value control for controlling lighting of the LED if it is lower (or darker) than the predetermined value.

According to the technique of JPA 2005-267999, a dimming ratio is determined based on a lighting control signal and, depending on whether the dimming ratio is higher or lower than a predetermined value, a control is switched between PWM control and peak value control. However, operation becomes unstable before and after switching between PWM control and peak value control, causing flickering.

BRIEF SUMMARY OF THE INVENTION

In one aspect, a solid state light source lighting device capable of realizes a stable dimming control in a wide range.

According to a first aspect of the present invention, a solid state light source lighting device is provided as shown in FIG. 1, with a DC power circuit 1 for causing a current to flow in a solid state light source 3 (e.g., and LED) through power conversion of an input DC power source Vdc by using a switching element Q1, and a current controller 2 for controlling the switching element Q1 to perform dimming control for current flowing in the solid state light source 3. The current controller 2 includes a first switching controller configured to change an on-time of switching element Q1 and a second switching controller configured to perform on/off control of switching element Q1. The energizing or on-period of the second switching controller is longer than one cycle of the first switching controller. Therefore, dimming control is carried out by the first switching controller and the second switching controller.

According to a second aspect of the invention, the first switching controller is prioritized in response to luminance equal to or higher than a predetermined luminance of the solid state light source, and the second switching controller is prioritized in response to luminance less than the predetermined luminance (see FIG. 4).

According to a third aspect of the present invention, the DC power circuit 1 causes current to flow in the solid state light source 3 by connecting an inductor L1 in series to the switching element Q1 and using charging and discharging currents of the inductor L1 or any of the currents, wherein the first switching controller controls the switching element Q1 so that the inductor currents perform a zero cross operation.

According to a fourth aspect, the DC power circuit 1 includes a capacitive impedance (such as a smoothing capacitor C1) connected in parallel with the solid state light source 3 and current flowing in the solid state light source 3 exhibits a continuous waveform.

According to a fifth aspect, a dimming controller is provided to output a dimming control signal corresponding to an external lighting control signal, the output level of each of the switching controllers in the current controller changes in accordance with a signal level of the dimming control signal, and the dimming controller outputs one signal (see FIG. 5).

According to a sixth aspect, a dimming controller is provided to output a dimming control signal corresponding to an external lighting control signal, and the dimming controller outputs two independent dimming control signals to the switching controller in the current controller respectively (see FIG. 3).

According to a seventh aspect, the second switching controller operates at a substantially lower limit value of an on-time applied in operating the first switching controller (see FIG. 4).

According to an eighth aspect, the solid state light source is an LED.

According to a ninth aspect, a light fixture is provided with the solid state light source lighting device according to any of the first to eighth aspects (see FIG. 6).

According to a tenth aspect, a lighting device is provided with the solid state light source lighting device according to any of the first to eighth aspects (see FIG. 6).

According to one aspect, the first switching controller is provided to change an on-time of the switching element and the second switching controller is provided to perform an energizing/de-energizing control for the switching element, wherein the energizing period of the second switching controller is longer than one cycle of the first switching controller, and the dimming control is carried out by the first switching controller and the second switching controller, so that there is such an effect that a stable dimming control can be realized in a wide range.

DETAILED DESCRIPTION OF THE INVENTION

Figure 1:
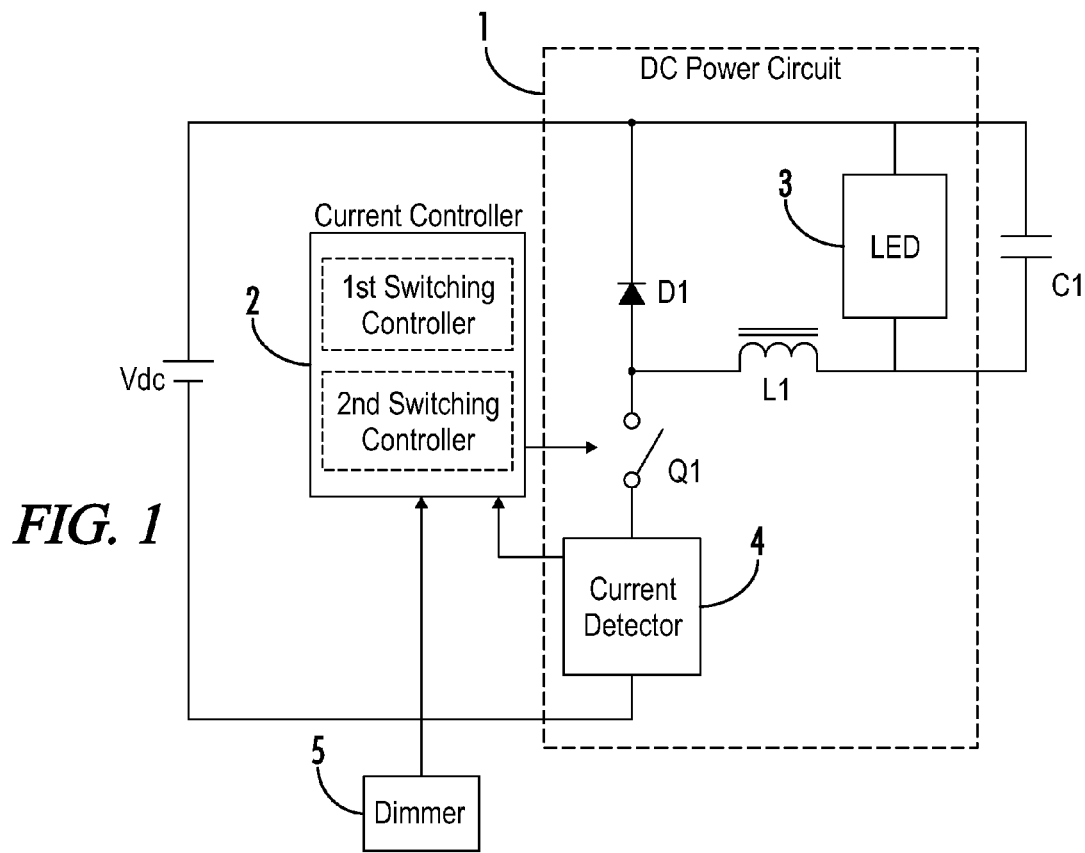
FIG. 1 is a partial circuit diagram showing a schematic configuration of one embodiment of a lighting device according to the present invention.

FIG. 1 is a circuit diagram showing one embodiment of a lighting device according to the present invention. A DC power circuit 1 is connected to an input DC power source Vdc. In this embodiment, the DC power circuit 1 is a switching power circuit. Power supplied by the input DC power source Vdc is converted by using a switching element Q1 so as to supply a DC current to the solid state light source 3 such as an LED (or organic EL element). In this embodiment, a step-down chopper circuit (or back converter) is used.

The step-down chopper circuit has a well-known configuration in which, between a positive pole and a negative pole of the input DC power source Vdc, a series circuit including the solid state light source 3, an inductor L1, the switching element Q1 and a current detector 4 is connected. A regenerative diode D1 is connected in parallel with the series-connected solid state light source 3 and the inductor L1 so as to form a closed circuit.

The step-down chopper circuit also performs a well-known operation in which, when the switching element Q1 is turned on, a gradually increasing current flows in a path starting from the positive pole of the input DC power source Vdc to the solid state light source 3, to the inductor L1, to the switching element Q1, to the current detector 4, and to the negative pole of the input DC power source Vdc. Energy is stored in the inductor L1. When the switching element Q1 is turned off, because of a voltage induced in the inductor L1, a gradually decreasing current flows in a path starting from the inductor L1 to the regenerative diode D1, to the solid state light source 3, to the inductor L1. Energy inductor stored in L1 is thereby discharged.

The operation to turn on the switching element Q1 prior to completion of energy discharge in the inductor L1 is referred to as a continuous mode. The operation to turn on the switching element Q1 at a timing in which energy discharge in the inductor L1 is completed is referred to as a critical mode. The operation to turn on the switching element Q1 by passing through a quiescent period after completion of energy discharge in the inductor L1 is referred to as a discontinuous mode. In one embodiment, any of these modes may be used but the critical mode realizes high power conversion efficiency.

The switching element Q1 is turned on/off at high frequencies by the current controller 2. When the switching element Q1 is turned on, a gradually increasing current flowing in the switching element Q1 is detected by the current detector 4. A current detection value which is detected by the current detector 4 is compared to a predetermined threshold set by the current controller 2. If the current detection value reaches the predetermined threshold, the switching element Q1 is turned off. Therefore, a peak value of a current flowing in the switching element Q1 is set to a predetermined threshold.

Figure 2:
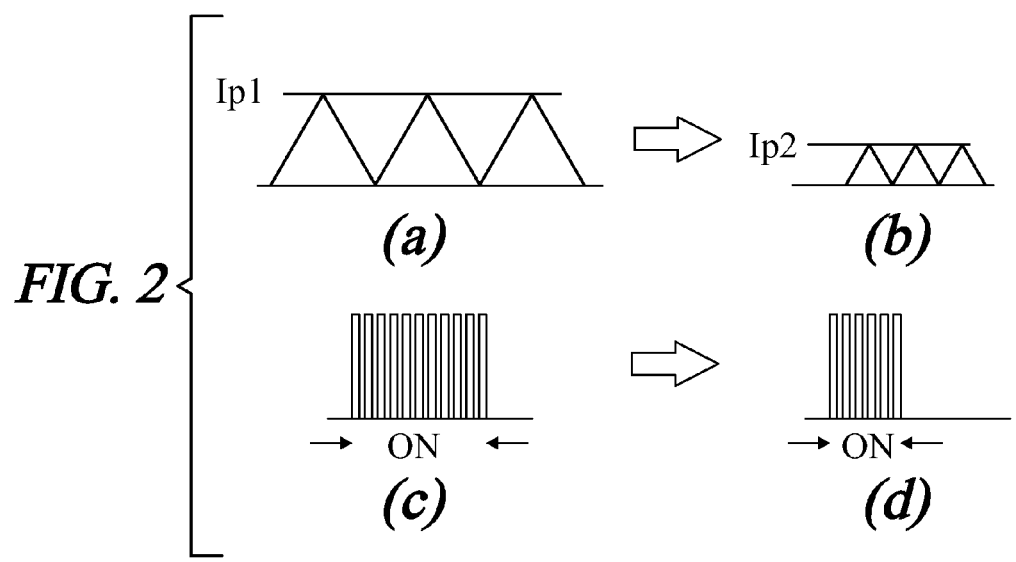
FIGS. 2(a)-2(d) show operational waveforms corresponding to the lighting device of FIG. 1.

FIGS. 2(a) and 2(b) show waveforms of a current flowing in the inductor L1 by an operation to turn on/off the switching element Q1. In a period in which current flowing in the inductor L1 increases gradually, the current therein is the same as a current flowing in the switching element Q1. In a period in which current flowing in the inductor L1 decreases gradually, the current therein is the same as a current flowing in the regenerative diode D1. In this example, current flowing in the inductor L1 is subjected to the aforementioned critical mode is exemplified but it may also be subjected to continuous mode or discontinuous mode operation.

FIG. 2(a) shows a case in which a predetermined threshold Ip1 set by the current controller 2 is at a predetermined high level and FIG. 2(b) shows a case in which a predetermined threshold Ip2 is at a predetermined low level. Each of the predetermined thresholds Ip1 and Ip2 set by the current controller 2 corresponds to a lighting control signal supplied from a dimmer 5 to the current controller 2.

FIGS. 2(c) and 2(d) show voltage waveforms of a control signal outputted from the current controller 2 to the switching element Q1. FIG. 2(c) shows a case in which a long burst-on period is set for the switching element Q1 and FIG. 2(d) shows a case in which a short burst-on period is set therefor. The burst-on period refers to a period in which a high-frequency operation to turn on/off the switching element Q1 is allowed. During the burst-on period, the switching element Q1 is energized (or activated). In a period other than the burst-on period, the switching element Q1 is de-energized (or inactivated). The burst-on period is set by the current controller 2 in accordance with a lighting control signal supplied from the dimmer 5 to the current controller 2.

Burst-on operations as shown in FIGS. 2(c) and 2(d) are repeated at a predetermined frequency (which is, for example, in a range of several hundreds Hz to several kHz). The frequency to repeat the operation is set lower than a high frequency to turn on/off the switching element Q1 of the DC power circuit 1 (i.e. several tens kHz). Note that a time axis shown in FIGS. 2(a) and 2(b) is expanded more than a time axis of FIGS. 2(c) and 2(d).

In the current controller 2, by reading a lighting control signal supplied from the dimmer 5, a peak value of current flowing in the switching element Q1 is set as shown in FIGS. 2(a) and 2(b), and a burst-on period to allow a high-frequency operation to turn on/off the switching element Q1 is set as shown in FIGS. 2(c) and 2(d). Assuming the former to be first switching controller and the latter to be second switching controller, by combining both controllers to be applicable simultaneously, stable dimming control operation can be realized over a wide range.

For example, in a high (or bright) dimming ratio, the peak value Ip1 of a current flowing in the switching element Q1 is set high as shown in FIG. 2(a), as well as a burst-on period is set long as shown in FIG. 2(c). In contrast, in a low (or dark) dimming ratio, the peak value Ip2 of a current flowing in the switching element Q1 is set low as shown in FIG. 2(d), as well as a burst-on period is set short as shown in FIG. 2(d). By thus applying the first switching controller and the second switching controller in combination, dimming control can be realized in a wide range.

Also, in contrast to Japanese Patent Application No. JPA2005-267999, it is unnecessary to switch between PWM control and peak value control in the middle of a dimming control range, which makes it possible to realize, without having unstable operation before and after the switching, a stable dimming control operation in a wide range.

Although the step-down chopper circuit is exemplified as the DC power circuit 1 in FIG. 1, various kinds of switching power circuits such as a step-up chopper circuit, a step-up/step-down chopper circuit and a flyback converter circuit may also be used.

Figure 3:
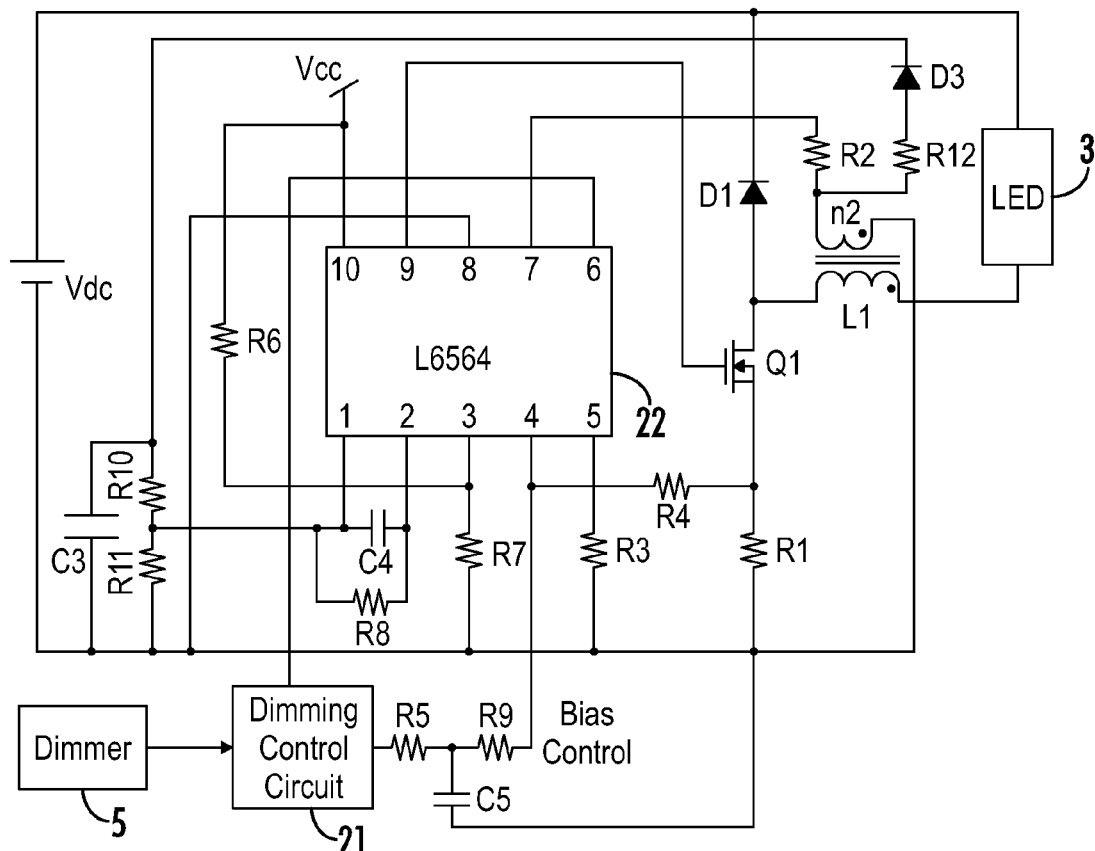
FIG. 3 is a circuit diagram of an embodiment of a lighting device according to the present invention.

Referring now to FIG. 3, a circuit diagram for an embodiment of a lighting device is shown. To less expensively control a peak value of a current flowing in the switching element Q1 to the predetermined thresholds Ip1 and Ip2 as shown in FIGS. 2(a) and 2(b) and operate in the aforementioned critical mode, a general-purpose integrated circuit (IC) 22 for controlling power factor improvement is used.

One integrated circuit of this type for controlling power factor improvement is the L6562 device made by STMicroelectronics. The embodiment of FIG. 3 employs, to allow an external signal to set a burst-on period for a control signal applied to the switching element Q1 as shown in FIGS. 2(c) and 2(d), the L6564 device made by STMicroelectronics as an integrated circuit in which whether or not a power factor improvement control (PFC) is possible can be selected by an external signal.

The L6564 device may be used by adding a PFC-OK terminal (or sixth pin) and a VFF terminal (or fifth pin) to the conventional L6562 device provided with 8 pins, and arranging other pins to follow the arrangement of pins in the conventional L6562 device.

The circuit configuration of FIG. 3 can be understood by briefly explaining a function of each terminal in IC 22 (e.g., the L6564 device).

Pin 10 is a power terminal connected to a control power voltage Vcc. Pin 8 is a ground terminal connected to a negative pole of the input DC power source Vdc (or circuit ground).

Pin 9 is a gate drive terminal connected to a gate electrode of the switching element Q1 which, in one embodiment, is a MOSFET.

Pin 7 is a zero cross detection terminal connected to one end of a secondary winding n2 of the inductor L1 via a resistor R2. The second end of the secondary winding n2 is grounded. If Pin 6 (used as a PFC-OK terminal) has a voltage less than 0.23V, IC 22 is shut down. To restart IC 22, it is necessary to set Pin 6 to be higher than 0.27V. Pin 6 can be therefore used as a remote on/off control input.

Pin 5 is a feed-forward terminal that is not used in the embodiment of FIG. 3 and therefore connected to circuit ground via a resistor R3.

Pin 4 is a current detection terminal that receives, via a resistor R4, a voltage from current detection resistor R1 coupled between a source electrode of the switching element Q1 (e.g., a MOSFET) and circuit ground. Pin 4 also receives a bias voltage for dimming control via resistor R9.

Pin 3 is used as an input for a multiplier incorporated in IC 22 and is set to, in the present embodiment, a predetermined voltage obtained by dividing the control power voltage Vcc via resistors R6 and R7.

Pin 1 is an inverted input terminal for an error amplifier incorporated in IC 22. Pin 2 is an output terminal of the error amplifier. Between Pin 1 and Pin 2, as a feedback impedance for the error amplifier, a parallel circuit including resistor R8 and capacitor C4 is connected. Pin 1 also receives a voltage signal for negative feedback, which is obtained by dividing the voltage across capacitor C3 via resistors R10 and R11. Capacitor C3 is charged with a voltage induced in the secondary winding n2 of the inductor L1 via a resistor R12 and a diode D3. If the voltage across capacitor C3 increases, the switching element Q1 is controlled to have a narrowed on-pulse width.

If the current flowing in the current detection resistor R1 increases when the switching element Q1 is turned on, the voltage detected by Pin 4 rises. If the voltage at Pin 4 reaches a predetermined threshold, the switching element Q1 is turned off. Thereafter, in a period during which energy of the inductor L1 is discharged via a diode D1, a voltage is induced in the second winding n2 of the inductor L1. When a regenerative current flowing via the diode D1 stops flowing, the voltage induced in the secondary winding n2 dissipates, resulting in a decreasing voltage at Pin 7. By detecting the falling of the voltage at Pin 7, the switching element Q1 is turned on again.

At Pin 4, the DC voltage at capacitor C5 is superimposed via the resistor R9. The capacitor C5 is charged/discharged by a signal outputted from a dimming control circuit 21 via a resistor R5. The output signal of the dimming control circuit 21 is, for example, a rectangular wave voltage signal and, depending on the ratio of a high-level period and a low-level period of the signal, a DC voltage charged in the capacitor C5 changes. That is, the capacitor C5 and the resistor R5 constitute an RC filter circuit (or integration circuit).

A High DC voltage charged in the capacitor C5 is accompanied by a high voltage in Pin 4, whereby current flowing in the switching element Q1 is detected as it has an apparent increase and a peak value of a current flowing in the switching element Q1 becomes low as shown in FIG. 2(b).

A Low DC voltage charged in the capacitor C5 is accompanied by a low voltage in Pin 4, whereby current flowing in the switching element Q1 is detected as it has an apparent decrease and a peak value of a current flowing in the switching element Q1 becomes high as shown in FIG. 2(a).

As stated above, by adjusting the magnitude of a DC voltage charged in the capacitor C5 depending on the ratio of the high-level period and the low-level period of a rectangular wave voltage signal outputted from the dimming control circuit 21 (i.e. on/off duty), the peak value of current flowing in the switching element Q1 can be adjusted.

The dimming control circuit 21 may also include, for example, a microprocessor for dimming control. In this case, as an output terminal a, one of binary output ports for outputting a rectangular wave voltage signal may be allocated.

Also, if a microprocessor having a D/A conversion output port is used as the output terminal a in place of the binary output port, the RC filter circuit made of the resistor R5 and the capacitor C5 can be omitted. Even in this case, without omitting the RC filter, if an analog output voltage is inputted from the D/A conversion output port to the RC filter circuit and a DC voltage adjacent to the output voltage with a gap of 1 gradation is switched according to a predetermined duty cycle, a DC voltage can be generated with multi-gradations in comparison with an original gradation in D/A conversion. Moreover, in comparison with the case of using the binary output port, even a small time constant defined by the resistor R5 and the capacitor C5 makes it possible to reduce ripple in a DC voltage charged in the capacitor C5, whereby control responsiveness can be improved.

As an output terminal b for specifying a burst-on period as shown in FIGS. 2(c) and 2(d), the other binary output port of a microprocessor may be allocated to output a rectangular wave voltage signal which is brought into a High level (>0.27 V) in a burst-on period and a Low level (<0.23 V) in other periods.

Figure 4:
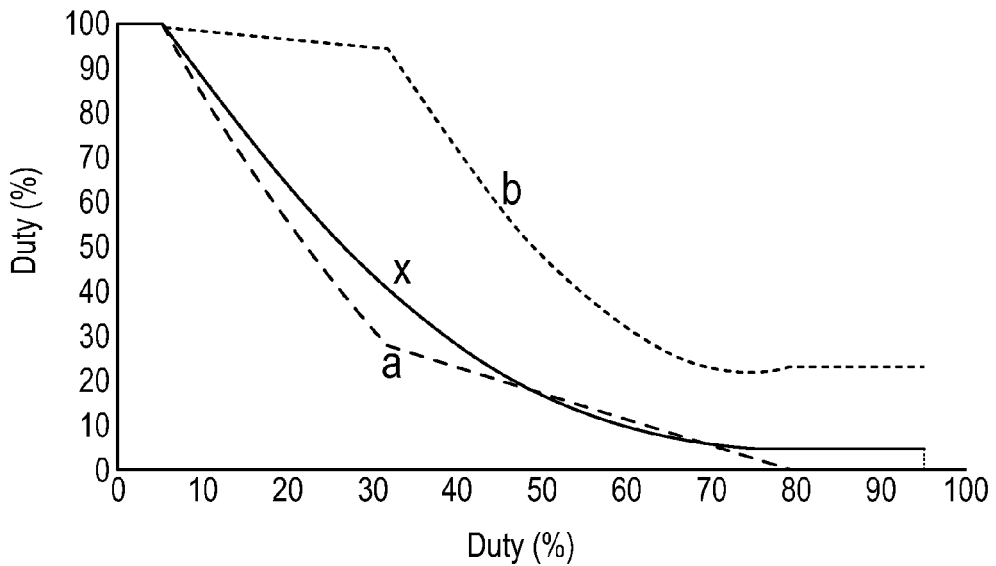
FIG. 4 is a graphical diagram corresponding illustrating operation of the lighting device of FIG. 3.

FIG. 4 shows a relationship between a duty (%) of a rectangular wave output voltage signal to be outputted from each of the output terminals a and b of the dimming control circuit 21, and a duty (%) of a lighting control signal to be inputted from the dimmer 5 to the dimming control circuit 21. A dashed line a in FIG. 4 shows an off-duty change of a rectangular wave voltage signal outputted from the first output terminal a and a dashed line b in FIG. 4 shows an on-duty change of a rectangular wave voltage signal outputted from the second output terminal b.

The duty (%) of a lighting control signal inputted from the dimmer 5 to the dimming control circuit 21 changes in a range from 0% to 100%. A duty less than 5% corresponds to full lighting and a duty of 95% or more corresponds to no light output. Such a lighting control signal has been widely used in the field of inverter-type fluorescent lamp lighting devices and, in general, a rectangular voltage signal with frequency of 1 kHz and amplitude of 10 V is used.

By reading the duty (%) of a lighting control signal inputted from the dimmer 5 and in accordance with the duty, the dimming control circuit 21 changes the duty of a rectangular wave voltage signal outputted from the first output terminal a and the duty of a rectangular wave voltage signal outputted from the second output terminal b. As a result, the brightness of the solid state light source 3 changes with characteristics close to a curve to the power of 2.3 as shown in solid line X of FIG. 4. A curve to the power of 2.3, which is generally called a Munsell characteristic curve being one kind of dimming control curves, is known to have characteristics of showing a smooth brightness change in response to a dimming control operation.

If the dimming control circuit 21 includes a microprocessor, control characteristics as exemplified in FIG. 4 may be stored in a built-in memory as a data table. In this case, by reading, from the data table as an address, a digital value obtained by reading the duty (%) of a lighting control signal inputted from the dimmer 5, based on the read data, the duty of a rectangular wave voltage signal outputted from each of the terminals a and b of the dimming control circuit 21 may be controlled.

Figure 5:
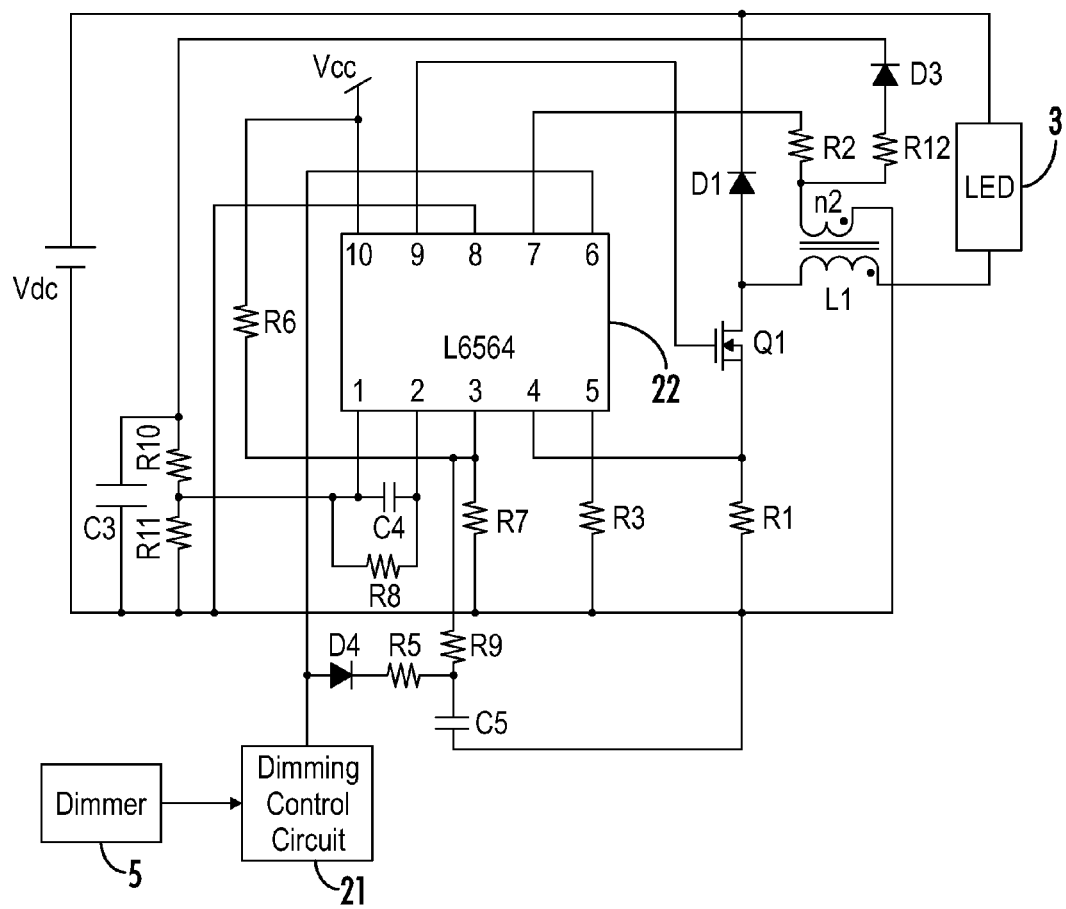
FIG. 5 is a partial circuit diagram of an embodiment of a lighting device according to the present invention.

Referring now to FIG. 5, a circuit diagram for another embodiment of lighting device is shown. In this embodiment, by subjecting one lighting control signal outputted from the dimming control circuit 21 to signal conversion external to the dimming control circuit 21, a dimming control signal with respect to the first switching controller and a dimming control signal with respect to the second and first switching control signals are generated.

A lighting control signal outputted from the dimming control circuit 21 to Pin 6 of IC 22 is, similar to the embodiment of FIG. 3, a rectangular wave voltage signal of low frequencies (in a range of several hundreds Hz to several kHz). The pulse width thereof is made variable to be able to authorize and/or inhibit the IC 22 to operate. By inputting the lighting control signal to a filter circuit made of the resistor R5 and a capacitor C5 via a diode D4, it is converted into a DC voltage.

The DC voltage is superimposed, in the circuit example of FIG. 5, in a resistor R7 connected to Pin 3 via a resistor R9. A high DC voltage in the capacitor C5 is accompanied by a high voltage at Pin 3 of the IC 22, whereby a threshold voltage for use in turning off the switching element Q1 is set high. Accordingly, if a burst-on period is long as shown in FIG. 2(c), the peak value Ip1 of current flowing in the switching element Q1 becomes high as shown in FIG. 2(a).

In contrast, if a low DC voltage in the capacitor C5 is associated with a low voltage at Pin 3 of the IC 22, whereby a threshold voltage for use in turning off the switching element Q1 is set low. Therefore, if a burst-on period is short as shown in FIG. 2(d), the peak Ip2 of current flowing in the switching element Q1 becomes low as shown in FIG. 2(b). Therefore, stable dimming control can be realized over a wide range.

Note that, as opposed to the circuit example of FIG. 5 in which one lighting control signal outputted from the dimming control circuit 21 is a rectangular wave voltage signal, the lighting control signal outputted from the dimming control circuit 21 may also be a DC voltage. In this case, by using an external low-frequency oscillation circuit to convert a DC voltage outputted from the dimming control circuit 21 into a rectangular wave voltage signal with a variable pulse width (i.e. PWM signal), a converted signal may be used to control Pin 6 of the IC 22. Also, a signal obtained before conversion (i.e. DC voltage) may be directly inputted to Pin 3 of the integrated circuit 22.

In each of the aforementioned embodiments, explanation was made on the assumption that, as a lighting control signal outputted from the dimmer 5, a rectangular wave voltage signal with a base frequency of 1 kHz and amplitude of 10V is used, but it is not so limited. For example, various kinds of standardized lighting control signals such as DALI and DMX512 may be used or, through shaping a waveform of a voltage obtained by controlling phase of a commercial AC power source (of 50/60 Hz), a PWM signal of 100/120 Hz may also be extracted from a power line as a lighting control signal. Alternatively, the dimmer 5 may be simply a variable resistor and may have a configuration such that a lighting control signal made of a DC voltage is read by an A/D conversion input port of the dimming control circuit 21.

Figure 6:
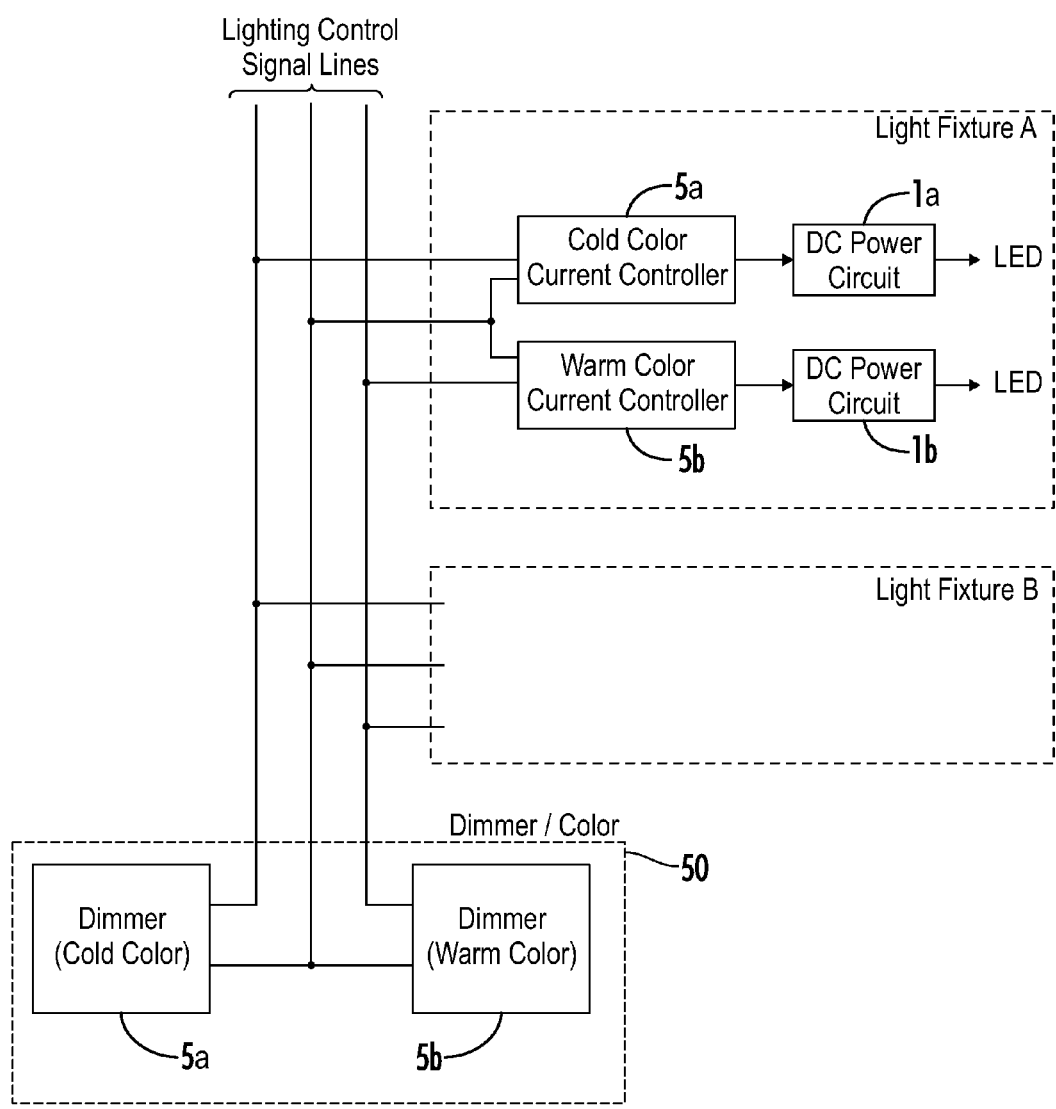
FIG. 6 is a block circuit diagram of an embodiment of lighting device according to the present invention.

Referring to FIG. 6, a block diagram shows a schematic configuration of an embodiment of lighting system according the present invention. In the embodiment of FIG. 6, a first light fixture A is provided with a cold-color LED and a warm-color LED, wherein light output of the LEDs can be controlled individually by DC power circuits 1a and 1b and current controllers 2a and 2b. A light fixture B is configured to be the same as the light fixture A so as to form a lighting system in which a plurality of light fixtures (e.g., lighting devices) are connected to the same lighting control signal line.

A dimming/color control device 50 for controlling each of the light fixtures A, B, ... includes a dimmer 5a for transmitting a lighting control signal to the cold-color current controller 2a and a dimmer 5b for transmitting a lighting control signal to the warm-color current controller 2b. By individually controlling a lighting control signal outputted from each of the dimmers 5a and 5b, the brightness and color temperatures of each of the light fixtures A and B, etc. can be controlled. For example, illumination with different color temperatures such as a daylight light color, a daylight white color and a lamp color, which are widely used in the field of fluorescent lamps, can be realized with any brightness.

Although the example of FIG. 6 uses two kinds of light sources including the cold-color LED and the warm-color LED, if LEDs of three primary light colors including R (red), G (green) and B (blue) are used, any light emitting colors can be realized.

Figure 7:
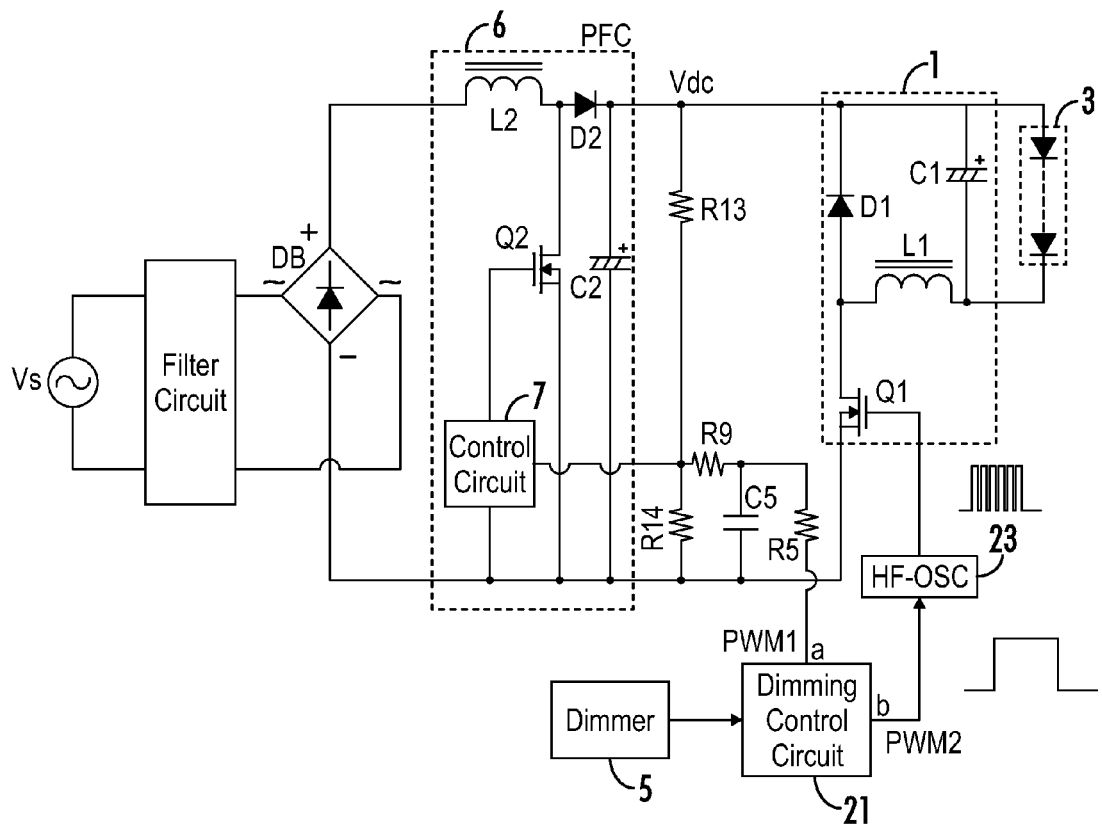
FIG. 7 is a circuit diagram of an embodiment of a lighting device according to the present invention/

Referring to FIG. 7, a circuit diagram shows one embodiment of a lighting device. The embodiment of FIG. 7 uses a power factor improving circuit such as a step-up chopper circuit 6 as the input DC power source Vdc. The step-up chopper circuit 6 has a well-known configuration and operation such that, when a switching element Q2 is turned on, current flows in a path from an AC power source Vs to a Filter Circuit, to a full-wave rectifier DB, to an inductor L2, and to the switching element Q2 so as to introduce an input current from the AC power source Vs and allow the inductor L2 to accumulate energy therein. When the switching element Q2 is turned off, voltage induced in the inductor L2 is superimposed on a voltage outputted from the full-wave rectifier DB and charged in a smoothing capacitor C2 via a diode D2. At this time, current flows in a path from the AC power source Vs to the Filter Circuit, to the full-wave rectifier DB, to the inductor L2, to the diode D2, and to the smoothing capacitor C2 to introduce an input current from the AC power source Vs. The input power factor is therefore improved. The DC voltage Vdc which is boosted to exceed a peak value of a voltage outputted from the full-wave rectifier DB is charged in the smoothing capacitor C2.

This type of power factor improvement circuit is generally provided with a control circuit 7 for stabilizing the output voltage to a predetermined target value. Therefore, in this embodiment, while the on-pulse width of the switching element Q1 is fixed, by changing the on-pulse width of the switching element Q2, the voltage of the input DC power source Vdc of a DC power source circuit 1 is made variable to change the peak current flowing in the switching element Q1.

A first rectangular wave voltage signal (PWM1) outputted from a terminal a of the dimming control circuit 21 is converted into a DC voltage by a RC filter circuit made of the resistor R5 and a capacitor C5. The DC voltage is superimposed on a voltage detected by a circuit (i.e. voltage dividing circuit made of resistors R13 and R14) which detects an output voltage of the step-up chopper circuit 6 via a resistor R9.

If the DC voltage increases at capacitor C5, the voltage Vdc outputted from the step-up chopper circuit 6 is detected as it has an apparent increase. Therefore, the control circuit 7 is operated to reduce the output voltage Vdc. Then, even if an on-pulse width of the switching element Q1 remains the same, there is a change in an inclination made by an increase of a gradually increasing current which flows in the inductor L1 when the switching element Q1 is turned on, whereby, before the period to turn on the switching element Q1 is finished, the peak value of a current flowing in the switching element Q1 changes.

Figure 8:
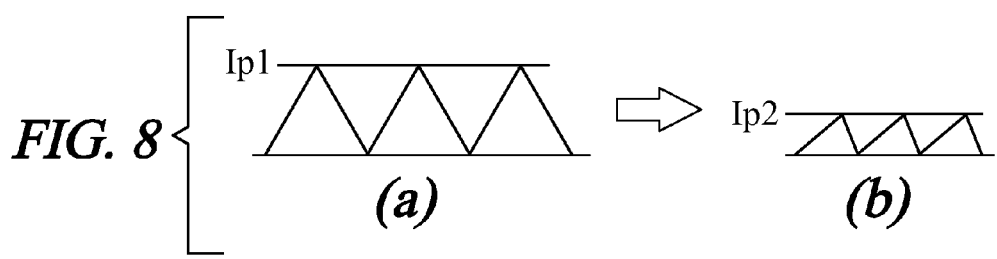
FIGS. 8(a) and (b) are waveform diagrams illustrating operation of a lighting device corresponding to FIG. 7.

This operation will be explained by using FIGS. 8(a) and 8(b). FIG. 8(a) shows a current flowing in the inductor L1 when the voltage Vdc outputted from the step-up chopper circuit 6 is high, wherein, as the inclination made by an increase of a gradually increasing current flowing in the switching element Q1 is large even if a period to turn on the switching element Q1 is fixed, the peak value Ip1 of current flowing in the switching element Q1 becomes high in finishing the on-period of the switching element Q1.

FIG. 8(b) shows current flowing in the inductor L1 when the voltage Vdc outputted from the step-up chopper circuit 6 is low, wherein, as the inclination made by an increase of a gradually increasing current flowing in the switching element Q1 is small even if a period to turn on the switching element Q1 is fixed, the peak value Ip2 of current flowing in the switching element Q1 becomes low in finishing the on-period of the switching element Q1.

In the embodiment of FIG. 7, the on-time width and on/off cycle of the switching element Q1 correspond to a fixed value set by a high frequency oscillation circuit 23. The high frequency oscillation circuit 23 performs an oscillation operation in which oscillation start and oscillation stop are switched by a second rectangular wave voltage signal (PWM2) outputted from a terminal b of the dimming control circuit 21. If the rectangular wave voltage signal (PWM2) which corresponds to a low frequency in a range of several hundreds Hz to several kHz is brought into a high level, the high frequency oscillation circuit 23 outputs a control signal to turn on/off the switching element Q1 at a high frequency of several tens kHz, and if it is brought into a Low level, the high frequency oscillation circuit 23 is operated to maintain the switching element Q1 to be turned off.

As stated above, in the embodiment of FIG. 7, changing the peak current flowing in the switching element Q1 is provided while omitting means adapted to detect the peak thereof. Therefore, there is an advantage such that power loss caused by a current detection resistor can be reduced. If the embodiment of FIG. 7 is used in a continuous mode, due to the lack of a peak current limiting function, a concern of magnetic saturation in the inductor L1 remains. Therefore, the on-time width and on/off cycle of the high frequency oscillation circuit 23 are set so that, when the voltage Vdc which is set by a first lighting control signal (i.e. rectangular voltage signal PWM1) and outputted from the step-up chopper circuit 6 exhibits a maximum value, current flowing in the inductor L1 is brought into the discontinuous mode with a slight quiescent period (i.e. discontinuous mode close to a critical mode) as shown in FIG. 8(a). If the voltage Vdc outputted from the step-up chopper circuit 6 is less than a maximum value, the peak current flowing in the switching element Q1 decreases as shown in FIG. 8(b), whereby current flowing in the inductor L1 is always brought into the discontinuous mode.

If the solid state light source 3 is made of a series circuit including an n number of light emitting diodes as shown in FIG. 7, in a period of turning off the switching element Q1, the voltage applied to the inductor L1 during application of a regenerative current is a forward voltage expressed by "forward voltage Vf of light emitting diode×n+forward voltage of regenerative diode D1." The rate of decrease in current flowing in the inductor L1 is therefore substantially constant.

In a period of turning on the switching element Q1, the voltage applied to the inductor L1 is expressed by "output voltage Vdc of the step-up chopper circuit 6—forward voltage Vf of light emitting diode×n—on-voltage of switching element Q1." The reduction of the output voltage Vdc is accompanied by reduction in the rate at which current flowing in the inductor L1 increases.

The embodiment of FIG. 7 changes the voltage of the input DC power source Vdc to change the peak current flowing in the switching element Q1. If, for example, a lighting circuit with LEDs of two systems including a cold color system and a warm color system is incorporated in one light fixture as shown in FIG. 6, main power sources should be provided for the two systems. Accordingly, the embodiment of FIG. 7 is suitable for an LED dimming control lighting device without a color control function.

Figures 9, 10:
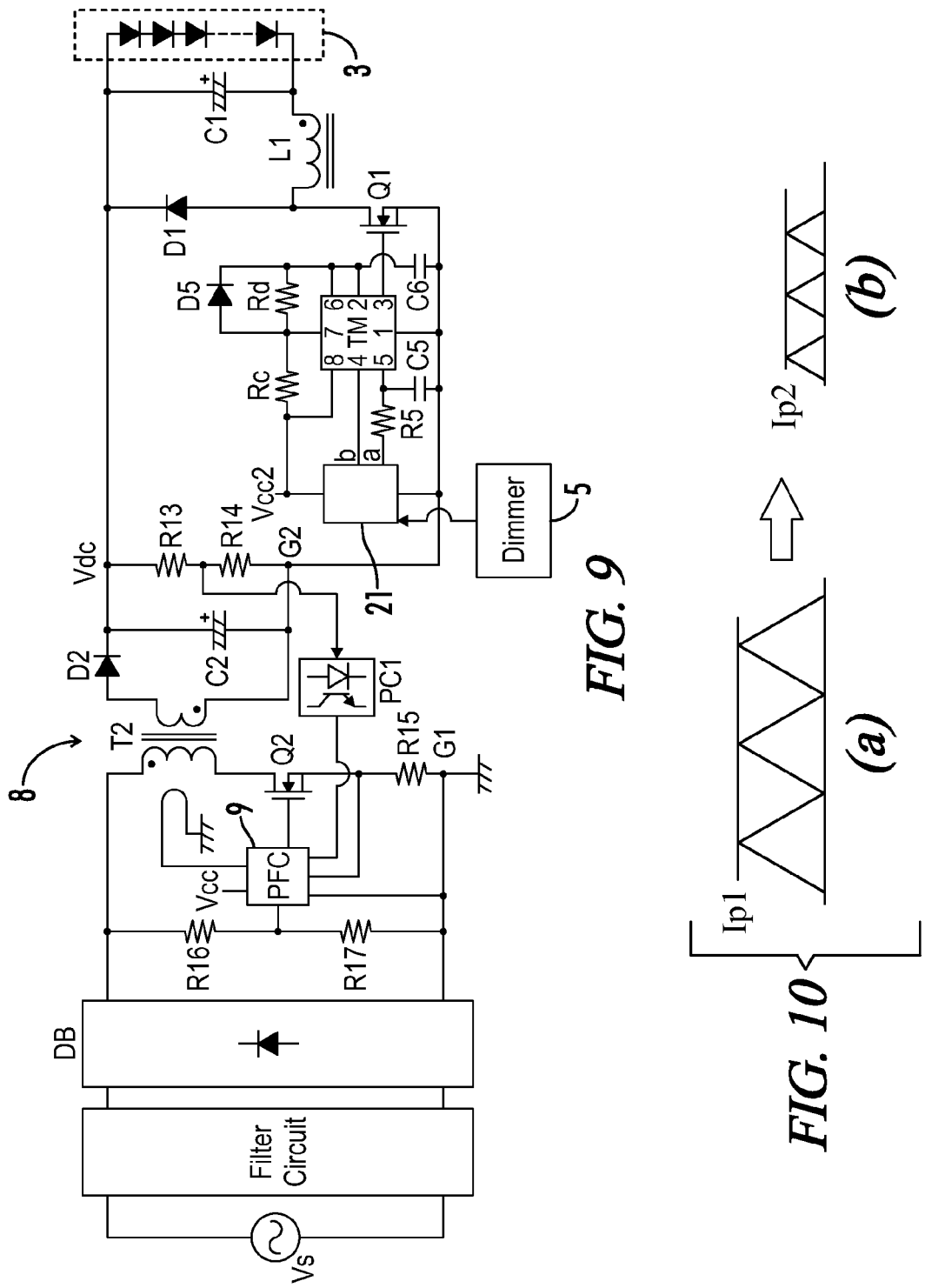
FIG. 9 is a circuit diagram of an embodiment of a lighting device according to the present invention.
FIG. 10 is a waveform diagram illustrating operation of a lighting device corresponding to FIG. 9.

FIG. 9 is a circuit diagram of another embodiment of a lighting device. In the embodiment of FIG. 9, a flyback converter circuit 8 is used as the input DC power source Vdc. Also, a timer circuit TM is used to change the on-pulse width of the switching element Q1 in accordance with a DC voltage at capacitor C5 to change the peak current flowing in switching element Q1.

The flyback converter circuit 8 has a well-known configuration and operation in which a series circuit made of a primary winding of a transformer T2 and a switching element Q2 is connected to a DC output end of a full-wave rectifier DB. A smoothing capacitor C2 is connected to both ends of a secondary winding of the transformer T2 via a diode D2. The polarity of the diode D2 is connected in a direction to prevent a current from flowing when the switching element Q2 is turned on.

When the switching element Q2 is turned on, an input current is introduced from an AC power source Vs via the full-wave rectifier DB and the primary winding of the transformer T2. At this time, the diode D2 is in a non-conductive state, whereby the transformer T2 functions as an inductor and energy is accumulated in the transformer T2. When the switching element Q2 is turned off, energy accumulated in the transformer T2 is discharged to the smoothing capacitor C2 via the diode D2. The DC voltage Vdc obtained in the smoothing capacitor C2 is insulated from an input side (i.e. AC power source side). To transmit, to a PFC control circuit 9, a voltage detected by dividing a voltage of the smoothing capacitor C2 via resistors R13 and R14, a photo-coupler PC1 is used.

The PFC control circuit 9 which controls the switching element Q2 of the flyback converter circuit 8 detects a voltage obtained by dividing a pulsating voltage outputted from the full-wave rectifier DB via resistors R16 and R17. The PFC control circuit 9 operates so that a peak value of current which flows in the switching element Q2, and is detected in the primary winding of the transformer T2, has an envelope substantially proportional to a waveform of the pulsating voltage. Therefore, a source current of the switching element Q2 is detected through voltage conversion by a resistor R15. If the detected voltage reaches a target value which is substantially proportional to the pulsating voltage, the switching element Q2 is controlled to be turned off. Also, a voltage obtained by dividing a charge voltage of the smoothing capacitor C2 via the resistors R13 and R14 is detected and transmitted to the PFC control circuit 9 via the photo-coupler PC1. If the charge voltage Vdc of the smoothing capacitor C2 is low, the target value is set high so that the switching element Q2 should have a long on-time width. If the charge voltage of the smoothing capacitor C2 is high, the target value is set low so that the switching element Q2 should have a short on-time width. Also, by arranging an auxiliary winding for regenerative current detection in the transformer T2 and determining presence or absence of a voltage in the winding to detect dissipation (or zero-cross) of a regenerative current discharged from the transformer T2, the switching element Q2 is controlled to be turned on again at a point of time with no presence of a regenerative current.

Although it is omitted in FIG. 9, to show a configuration for obtaining a control power voltage Vcc of the PFC control circuit 9, it is possible to employ a configuration that, for example, after charging a power capacitor from an output end of the full-wave rectifier DB via a current-limiting resistor and using the charge voltage to allow the PFC control circuit 9 to start operating, the power capacitor is charged from a regenerative current detecting winding of the transformer T2 via a rectifying diode.

The on-pulse width of the switching element Q1 is set by the timer circuit TM. For the timer circuit TM, a general-purpose timer IC (e.g., a timer 555) can be used. For example, μPD5555 made by Renesas Electronics (which belongs to former NEC Electronics) or a compatible product may be used. Pin 1 of the timer circuit TM is a ground terminal and a Pin 8 is a power terminal. A control power voltage Vcc2 supplied to the power terminal may be supplied from the capacitor C2 on a secondary side via a control power circuit (not shown).

If Pin 2 which is a trigger terminal has a voltage less than half of the voltage at Pin 5, an internal flip-flop is inverted to bring Pin 3 (or output terminal) into a High level and Pin 7 (or discharge terminal) into an open state.

If Pin 4 which is a reset terminal is brought into a Low level, operation stops and Pin 3 (or output terminal) is fixed to a Low level.

Pin 5 pin is a control terminal and a reference voltage which is generally two-third of the power voltage Vcc2 by a built-in voltage dividing resistor is applied thereto. In the present embodiment, a DC voltage obtained by smoothing a low-frequency rectangular wave voltage signal outputted from a terminal a of the dimming control circuit 21 by using a filter circuit made of the resistor R5 and the capacitor C5 is applied thereto.

If Pin 6 which is a threshold terminal has a voltage higher than a voltage at Pin 5, an internal flip-flop is inverted to bring Pin 3 (or output terminal) into a Low level and Pin 7 (or discharge terminal) to be short-circuited to the Pin 1.

The dimming control circuit 21 reads a lighting control signal from a dimmer 5 and sets, in bringing the switching element Q1 into a burst-on stat, Pin 4 of the timer circuit TM to a High level over the burst-on period. At this time, the timer circuit TM operates as an astable multivibrator. If Pin 2 has a voltage less than half of the voltage at Pin 5, an internal flip-flop is inverted to bring Pin 3 into a High level and Pin 7 into an open state, whereby a capacitor C6 is charged via a charge resistor Rc and a diode D5. If a voltage charged in the capacitor C6 and applied to Pin 6 becomes higher than the voltage at Pin 5, an internal flip-flop is inverted to bring Pin 3 (or output terminal) into a Low level and Pin 7 (or discharge terminal) to be short-circuited to Pin 1. The capacitor C6 is therefore discharged via a discharge resistor Rd. If the voltage charged in the capacitor C6 and applied to Pin 2 becomes less than half of a voltage of Pin 5, an internal flip-flop is inverted to bring Pin 3 into a High level and Pin 7 into an open state, whereby the capacitor C6 is charged via the charge resistor Rc and the diode D5.

The timer circuit TM thus operates as a general astable multivibrator and an on-time width of the switching element Q1 is a variable width determined by a time constant of the charge resistor Rc and the capacitor C6 and the voltage at Pin 5. The off-time width of the switching element Q1 is also a variable width determined by a time constant of the discharge resistor Rd and the capacitor C6 and the voltage at Pin 5. Accordingly, during a burst-on period set by the dimming control circuit 21, the switching element Q1 is driven in accordance with an on-time width and an off-time width corresponding to a voltage set for Pin 5 by the dimming control circuit 21. Since reduction of a voltage at Pin 5 leads to a change of a voltage in the capacitor C6 for oscillation, the on-time width and off-time width are both made shorter, but a discharge current flowing via the resistor Rd decreases as opposed to an increase of a charge current flowing via the resistor Rc, so that a reduction ratio of an on-time width is larger than the reduction ratio of an off-time width.

In one embodiment, a light emitting diode is driven with a substantially constant load voltage. If the ratio of on-time width and an off-time width of a switching element Q1 is designed so that a current flowing in the inductor L1 is brought into a discontinuous mode close to a critical mode at a maximum voltage of Pin 5 as shown in FIG. 10(a), in spite of a voltage change at Pin 5, operation can always be carried out in the discontinuous mode. More specifically, a value may be designed for the resistors Rc and Rd and the capacitor C6 so that an on-time width is slightly shorter than a value under critical conditions expressed by "on-time width×(power voltage−load voltage)≈off-time width×load voltage".

In such a design, reduction of voltage at Pin 5 is accompanied by reduction of both on-time width and off-time width in the switching element Q1 as shown in FIG. 10(b), but the reduction ratio of an on-time width is larger than the reduction ratio of an off-time width, whereby a quiescent period of a current flowing in the inductor L1 increases.

Accordingly, by using the dimming control circuit 21 to reduce a voltage at Pin 5 of the timer circuit TM, it is possible as shown in FIG. 10(b) to reduce the peak of a current flowing in the inductor L1 and therefore set a long quiescent period of a current, whereby an average current flowing in a burst-on period can be reduced.

By using the dimming control circuit 21 to pulse Pin 4 of the timer circuit TM at low frequencies (in a range of several hundreds Hz to several kHz) and making a burst-on period variable, a current is controlled in a range from a state of allowing a high average current to flow over a long period of time to a state of allowing a low average current to flow over a short period of time, whereby a stable dimming control is realized in a wide range.

The smoothing capacitor C1 connected in parallel with the solid state light source 3 may be omitted in one embodiment, but if it is connected, there is such an effect that light flickering can be reduced in a light fixture.

The lighting device according to the present invention may be used for, without being limited to a light fixture, various kinds of light sources such as, for example, a backlight of a liquid crystal display and a light source of a projector. If it is used as a light source lighting device for this kind of image display devices, while omitting the smoothing capacitor C1 connected in parallel with the solid state light source 3, an image update cycle is synchronized with a burst-on cycle in one embodiment.

Although an LED is exemplified as the solid state light source 3 in the above explanation of each of the embodiments, it is not limited thereto and, for example, organic EL elements and semiconductor laser elements may also be used.

Thus, although there have been described particular embodiments of the present invention of a new and useful, it is not intended that such references be construed as limitations upon the scope of this invention except as set forth in the following claims.

What is claimed is:

1. A lighting device comprising:
   a switching element operable to enable current to flow from a direct current power circuit through a solid state light source when switched on, and to block current from flowing from the direct current power circuit through the solid state light source when switched off; and
   a current controller operable to provide a predetermined target current through the solid state light source by providing on-pulses to the switching element to selectively turn the switching element on, wherein the switching element is off when the switching element is not receiving an on-pulse from the current controller, said current controller comprising
   a first switching controller operable to determine a width of an on-pulse of a series of on-pulses, and
   a second switching controller operable to determine a burst-on time of a series of burst-on times, wherein during each burst-on time the series of on-pulses determined by the first switching controller is provided to the switching element.

2. The lighting device of claim 1 wherein the burst-on time is longer than a period of the on-pulse of the series of on-pulses.

3. The lighting device of claim 1 wherein:
   the second switching controller is operable to default to a minimum burst-on time;
   the first switching controller is operable to default to a maximum width of the on-pulse;
   when a current through the solid state light source exceeds the predetermined target current, the first switching controller reduces the determined width of the on-pulse; and
   when the current through the solid state light source is less than the predetermined target current, the second switching controller is operable to increase the burst-on time.

4. The lighting device of claim 1 further comprising a solid state light source, wherein the solid state light source comprises a light emitting diode.

5. The lighting device of claim 1 further comprising a dimming controller configured to receive an input from a dimmer and functional to provide a signal indicative of the predetermined target current to the current controller as a function of the input received from the dimmer.

6. The lighting device of claim 5 wherein the dimming controller is operable to provide a first signal indicative of the predetermined target current to the first switching controller and a second signal indicative of the predetermined target current to the second switching controller, wherein the first signal is different from the second signal.

7. The lighting device of claim 1 further comprising:
   an inductor connected in series with the solid state light source; and
   a current detector functional to provide a signal to the current controller indicative of a current through the inductor;
   wherein the first switching controller is operable to determine on-pulses as a function of the signal indicative of the current through the inductor such that the on-pulse begins when the current through the inductor is zero.

8. A method of providing a current to a solid state light source, said method comprising:
   enabling current to flow from a direct current power circuit through a solid state light source in response to and while receiving an on-pulse at a switching element of a solid state lighting device;
   determining, by a first switching controller, a width of an on-pulse of a series of on-pulses as a function of a predetermined target current;
   determining, by a second switching controller, a burst-on time of a series of burst-on times as a function of a predetermined target current; and
   providing on-pulses of the determined series of on-pulses to the switching element during burst-on times of the determined series of burst-on times.

9. The method of claim 8 wherein the burst-on time is longer than a period of the on-pulse of the series of on-pulses.

10. The method of claim 8 further comprising the steps of:
    defaulting to a minimum burst-on time;
    defaulting to maximum width of the on-pulse;
    reducing the determined width of the on-pulse when a current through the solid state light source exceeds the predetermined target current; and
    increasing the burst-on time when the current through the solid state light source is less than the predetermined target current.

11. The method of claim 8 further wherein the solid state light source comprises a light emitting diode.

12. The method of claim 8 further comprising the steps of:
    receiving input from a dimmer at a dimming controller; and
    providing a first signal indicative of the predetermined target current to the first switching controller and a second signal indicative of the predetermined target current to the second switching controller as a function of the received input.

13. The method of claim 12 wherein the first signal is different from the second signal.

14. The method of claim 8 further comprising:
providing a signal to the first and second current controllers indicative of a current through an inductor connected in series with the solid state light source; and
wherein determining, by the first switching controller, a width of an on-pulse of a series of on-pulses as a function of a predetermined target current further comprises determining on-pulses as a function of the signal indicative of the current through the inductor such that the on-pulse begins when the current through the inductor is zero.

15. A lighting system comprising:
a first lighting device comprising
- a solid state light source operable to emit light comprising a first color when supplied with current,
- a switching element operable to enable current to flow from a direct current power circuit through a solid state light source when switched on, and block current from flowing from the direct current power circuit through the solid state light source when switched off, and
- a current controller operable to provide a predetermined target current through the solid state light source by providing on-pulses to the switching element to selectively turn the switching element on, wherein the switching element is off when the switching element is not receiving an on-pulse from the current controller, said current controller comprising
  - a first switching controller operable to determine a width of an on-pulse of a series of on-pulses, and
  - a second switching controller operable to determine a burst-on time of a series of burst-on times, wherein during each burst-on time the series of on-pulses determined by the first switching controller is provided to the switching element;

a second lighting device comprising
- a solid state light source operable to emit light comprising a second color when supplied with current, wherein the second color is different from the first color of the first lighting device,
- a switching element operable to enable current to flow from a direct current power circuit through a solid state light source when switched on, and block current from flowing from the direct current power circuit through the solid state light source when switched off, and
- a current controller operable to provide a predetermined target current through the solid state light source by providing on-pulses to the switching element to selectively turn the switching element on, wherein the switching element is off when the switching element is not receiving an on-pulse from the current controller, said current controller comprising
  - a first switching controller operable to determine a width of an on-pulse of a series of on-pulses, and
  - a second switching controller operable to determine a burst-on time of a series of burst-on times, wherein during each burst-on time the series of on-pulses determined by the first switching controller is provided to the switching element; and a color control device operable to receive an input indicating a at least one of a desired color temperature and a desired brightness and provide a first dimmer signal to the first lighting device as a function of the received input and a second dimmer signal to the second lighting device as a function of the received input, wherein the second dimmer signal is different from the first dimmer signal.

16. The lighting system of claim 15 wherein:
the first dimmer signal is indicative of the target current of the current controller of the first lighting device; and
the second dimmer signal is indicative the target current of the current controller of the second lighting device.

17. The lighting system of claim 15 wherein a light fixture of the lighting system comprises the first lighting device and the second lighting device.

18. The lighting system of claim 15, further comprising:
a plurality of first lighting devices, each receiving the first dimmer signal from the color control device; and
a plurality of second lighting devices, each receiving the second dimmer signal from the color control device.

19. The lighting system of claim 15 wherein:
the first lighting device further comprises a dimming controller operable to receive the first dimmer signal from the color control device and provide a signal indicative of the predetermined target current to the current controller of the first lighting device as a function of the input received from the color control device; and
the second lighting device further comprises a dimming controller operable to receive the second dimmer signal form the color control device and provide a signal indicative of the predetermined target current to the current controller of the second lighting device as a function of the input received from the color control device.

20. The lighting system of claim 15 further comprising:
a third lighting device comprising a solid state light source operable to emit light comprising a third color when supplied with current, wherein the third color is red, the second color is green, and the first color is blue; and
wherein the color control device is operable to provide a third dimmer signal to the third lighting device as a function of the received input, wherein the third dimmer signal is different from the first and second dimmer signals.

* * * * *